United States Patent [19]

Strecker

[11] 3,862,251

[45] Jan. 21, 1975

[54] ORGANO-DILITHIUM INITIATOR FOR ANIONIC POLYMERIZATION, A NOVEL POLYISOPRENE, AND PROCESSES FOR PRODUCTION THEREOF

[75] Inventor: Ruediger A. H. Strecker, Oxon Hill, Md.

[73] Assignee: The United States of America as represented by the Secretary of the Navy

[22] Filed: Feb. 11, 1970

[21] Appl. No.: 10,643

[52] U.S. Cl. ........ 260/665 R, 252/431 L, 260/82.3, 260/83.7, 260/85.1, 260/86.1, 260/87.3, 260/88.7, 260/89.1, 260/89.5, 260/92.8, 260/94.2, 260/94.6, 260/94.7, 260/96, 260/880, 260/881, 260/884, 260/885
[51] Int. Cl. ............................................. C07f 1/02
[58] Field of Search .................. 260/665; 252/431 L

[56] References Cited
UNITED STATES PATENTS

| | | | |
|---|---|---|---|
| 2,816,935 | 12/1957 | Watson et al. | 260/665 |
| 3,157,604 | 11/1964 | Strobel | 252/431 |
| 3,278,617 | 10/1966 | Kahle et al. | 252/431 X |
| 3,280,084 | 10/1966 | Zelinski et al. | 260/83.7 |
| 3,312,680 | 4/1967 | Kahle | 252/431 X |
| 3,335,122 | 8/1967 | Trepka | 252/431 X |
| 3,429,829 | 2/1969 | Kahle | 252/431 |
| 3,439,049 | 4/1969 | Trepka | 252/431 X |
| 3,652,516 | 3/1972 | Farrar | 252/431 L |
| 3,668,263 | 6/1972 | Morrison et al. | 252/431 L |
| 3,725,365 | 4/1973 | Morrison et al. | 252/431 L X |
| 3,734,972 | 5/1973 | Naylor et al. | 220/665 R |

Primary Examiner—Patrick P. Garvin
Attorney, Agent, or Firm—R. S. Sciascia; J. A. Cooke

[57] ABSTRACT

An anionic polymerization process utilizing a novel organodilithium polymerization initiator, such as the addition product of sec-butyllithium and m-divinylbenzene, which is especially applicable for the polymerization of conjugated dienes to form high 1,4-steric configuration polymers. A low molecular weight polyisoprene having a microstructure of high cis 1,4 configuration as well as a high total 1,4 configuration, is prepared by the process of this invention.

28 Claims, No Drawings

ORGANO-DILITHIUM INITIATOR FOR ANIONIC POLYMERIZATION, A NOVEL POLYISOPRENE, AND PROCESSES FOR PRODUCTION THEREOF

BACKGROUND OF THE INVENTION

This invention generally relates to an organo-dilithium polymerization initiator and a process for making such, and more particularly to a process for anionic polymerization which utilizes said organo-dilithium initiator and is especially applicable for the preparation of a novel low molecular weight polyisoprene.

The discovery of stereospecific polymerization has opened a path which is bound to lead to far reaching developments. One such development has been in the area of the polymerization of conjugated dienes for the production of synthetic rubbers. For example, by means of an anionic mechanism, isoprene, when initiated by certain organo-lithium compounds in hydrocarbon solvents, has yielded high molecular polymer with a high 1,4-steric configuration. The advantages of the high 1,4-steric configuration of polyisoprene (especially high cis) lie in its similarity to natural rubber and concomitant similar desirable characteristics and, more specifically, to its unsaturated nature with an absence of pendant vinyl groups. Such characteristics are extremely desirable for example, for rocket propellant binders since such characteristics impart improved mechanical and oxidative properties to the propellant.

Although past attempts to prepare organo-monolithium compounds having the capability for initiating the stereospecific polymerization of isoprene to a high 1,4-configuration, as well as initiating stereospecific anionic polymerization for other monomers, have been successful, attempts to prepare organo-dilithium compounds possessing the same capabilities have not been successful. Among the reasons underlying this failure are (1) the insolubility of most organo-dilithium compounds in hydrocarbon solvents and (2) the necessity of preparing organo-dilithium compounds in ether; the complete removal of the ether is not possible due to a complex formation with the organo-dilithium compound. This complex prohibits the desired polymerization. Furthermore, one important capability of organo-dilithium initiators not possessed by the monolithium-organo counterparts, is that via the anionic polymerization mechanism, terminal functional groups, as well as other monomers for purposes of copolymerization, can be more simply attached to both ends of the desired polymer chain.

SUMMARY OF THE INVENTION

Accordingly, one object of this invention is to provide a new organo-dilithium compound initiator and process for production thereof.

Another object of the instant invention is to provide an organo-dilithium initiator which is preparable in and soluble in hydrocarbon solvents and capable of initiating anionic polymerizations.

Still another object of the present invention is to provide a new process for anionic polymerization which especially provides for the stereospecific polymerization of conjugated dienes, such as isoprene, to form polymers possessing 1,4 steric configuration.

Another object of this invention is to provide a low molecular weight polyisoprene possessing a higher microstructure percentage of 1,4-steric configuration than heretofore attained.

Still a further object of the instant invention is to provide a process for anionic polymerization which is also adaptable for synthesizing copolymers and terminal functional group polymers.

These and other objects are achieved by providing an organo-dilithium compound which is the addition product of an alkyllithium compound and divinylbenzene in a hydrocarbon solvent and utilizing said organo-dilithium addition product as an initiator in a hydrocarbon polymerization system.

DESCRIPTION OF THE PREFERRED EMBODIMENTS

The difunctional organo-lithium initiators of this invention are prepared by the addition of divinylbenzene to an alkyllithium in a hydrocarbon solvent. More specifically, the process involves, for example, the dropwise addition of a solution of m-divinyl-benzene in cyclohexane to a cyclohexane solution of sec-butyllithium. The order in which the reactants are added is important, i.e., the divinylbenzene must be added to the alkyllithium compound and not vice versa, since the reverse order results in the polymerization of the divinylbenzene rather than the production of the desired organo-dilithium compound initiator.

The addition of the divinylbenzene to the alkyllithium compound is performed preferably at or below room temperature (e.g., $-20°$ to about $20°C$) and with stirring, although higher temperatures may be utilized. Furthermore, the addition of the divinylbenzene should be rather slow, e.g., perhaps one drop per 5 seconds, although slightly faster rates may also be used. Obviously, in order to yield the desired organo-dilithium end product, the divinylbenzene must be added to the alkyllithium compound in a molar ratio of at least 1 to 2. However, due to the customary presence of impurities in the system, an excess of the alkyllithium is preferably employed. The organo-dilithium compound is completely formed after the addition of all the divinylbenzene (usually about 4–5 hours) and may be isolated, if desired, by stripping off the solvent. Usually, however, the initiator is kept in solution, since the same solvent can be employed in the subsequent polymerization process.

Any aliphatic, cycloaliphatic, aromatic hydrocarbon or mixture thereof in which the alkyllithium and divinylbenzene reactants are soluble may be employed in the process for the preparation of the initiator. Among such solvents are for example, pentane, hexane, heptane, cyclohexane, benzene, toluene, xylene, cumene, mixtures thereof and the like.

Among the alkyllithium compounds which are encompassed herein are included the lower-alkyllithiums, for example, ethyllithium, n-propyllithium, isopropyllithium, n-butyllithium, sec-butyllithium, tert-butyllithium, pentyllithium, hexyllithium, and the like.

The divinylbenzene within the scope of this invention includes all the isomers thereof, i.e., o-divinylbenzene, m-divinylbenzene, and p-divinylbenzene.

In another embodiment of this invention the dilithium-organo compounds of this invention are employed to initiate the anionic polymerization of dienes, acrylates and vinyl monomers. The polymerization reaction is performed in any of the above-identified hydrocarbons used in the preparation of the initiator. Accordingly, the desired monomer may simply be added to the final hydrocarbon solution in the preparation of the organo-dilithium initiator and polymerization occurs. On the other hand, if the organo-dilithium compound has already been isolated, it is again dissolved in a suitable hydrocarbon and the desired monomer is added thereto. In either procedure, no external heat or other catalysts are necessary for polymerization to occur. The quantity of organo-dilithium initiator which is employed in the polymerization process is not critical and is dependent upon the quantity of monomer used in the process, which in turn is dependent upon the desired molecular weight for the ultimate polymer end product. The concentration of the hydrocarbon solvent is also not critical and conventionally is employed in amounts in which the final polymer product will comprise about 20 percent by weight.

After complete polymerization has occurred (about 2–3 hours depending upon the quantities of reactants), the lithium atoms are removed from the polymer. Various means may be employed to achieve this result, among which are for example, treating the formed anionic polymer with a proton donor such as isopropanol and other alcohols, water, acids, such as hydrochloric and acetic, or the polymer may be treated with functional group terminating agents such as a hydroxyl group terminating agent like the cyclic oxides, e.g., ethylene oxide, propylene oxide, etc., ketones and aldehydes, e.g., acetone, acetaldehyde, etc., and oxygen, or a carboxyl group terminating agent such as carbon dioxide, or a thiol group terminating agent such as sulfur, cyclic sulfides like ethylene sulfide, propylene sulfide, etc., or an amino group terminating agent such as the cyclic imines like ethylene imine, propylene imine, etc. After the addition of the desired terminating agent to the anionic polymer, the reaction mixture is acidified, for example, with hydrochloric or acetic acid and the resultant lithium salts are filtered off. The desired polymer is isolated by stripping off the solvent. It is obvious, that the choice of terminating means employed depends upon the particular desired characteristics of the ultimate polymer.

The polymerization process of this invention, in addition to affording a means to obtain terminal functional group polymers, also affords a convenient means for the production of block polymers of the type ABA, CABAC, etc., and also copolymers. In the block polymerization process, the additional monomer or monomers is simply added to the formed anionic polymer in solution and allowed to polymerize. Obviously, to prepare a block polymer of the type CABAC, etc., the additional monomers are added in sequential order. In a copolymerization process, all the desired monomers are added simultaneously to the organo-dilithium initiator solution and allowed to copolymerize. After polymerization the anionic block polymer or copolymer is treated to remove the lithium atoms in the same way as described above. Among the additional monomers which may be employed for block polymerization, as well as, copolymerization purposes are included, for example, the dienes, acrylates and vinyl compounds disclosed above and which are more specifically described below, and other monomers such as styrene, methyl styrene, ethyl sturene or other vinyl compounds such as 1-vinylnaphthalene, 2-vinylnaphthalene and the like.

The polymerization process of this invention is particularly useful for the polymerization of conjugated dienes since the final polymer is of a high 1,4-steric configuration which is desirable for reasons already discussed. Among the conjugated dienes which are particularly applicable herein are, for example, isoprene 1,3-butadiene, piperylene, 1,3-hexadiene, 1,3-octadiene and the like. Of course, the present polymerization process is also applicable, as described above, for the polymerization of acrylates, such as methyl acrylate, ethyl acrylate, acrylonitrile and other esters of acrylic acid, vinyl compounds, such as vinyl acetate, and vinyl chloride and the like.

Of particularly special applicability herein is the polymerization of isoprene according to the process of this invention to low molecular weight (1,000–20,000) polyisoprene. The low molecular weight polyisoprene prepared by the polymerization process of this invention possesses a microstructure of extremely high 1,4-steric configuration (about 94–95 percent) with the remainder being of the 3,4-configuration. Furthermore, via the polymerization process of this invention polyisoprene containing terminal functionality and also possessing a microstructure of extremely high 1,4-steric configuration (about 94–95 percent) with the remainder being of the 3,4-configuration is prepared. This high 1,4-steric configuration is present regardless of the molecular weight of the terminal functional group polyisoprene. Accordingly, the polyisoprenes of this invention are particularly useful as propellant binders.

The particular hydrocarbon solvent or the terminating means employed in the isoprene polymerization has no substantial effect upon the microstructure of the polyisoprene formed.

It is to be understood, however, that although the polymerization process of this invention is especially applicable for the polymerization isoprene, it is also utilizable for preparing any molecular weight polymers, block polymers or copolymers of all the monomers disclosed and described hereinbefore.

Having generally described the invention, the following examples are given for purposes of illustration. It will be understood that the invention is not limited to these examples, but is susceptible to different modifications that will be recognized by one of ordinary skill in the art.

EXAMPLE 1

Forty milliliters of sec-butyllithium (about 10 percent in hexane) and 450 milliliters of cyclohexane are placed in a three-neck, one liter flask equipped with a stirrer and a dropping funnel. Three milliliters of m-divinylbenzene in 100 milliliters of cyclohexane are dropped into the solution (at about 1 drop/5 seconds) with stirring at room temperature. After this addition is complete, 100 milliliters of isoprene are added to the clear red solution with stirring and after polymerization (about 3–4 hours), a slight orange, viscous solution is obtained into which five milliliters of ethylene oxide are condensed. The solution is acidified with the addition of acetic acid. After filtering, the solvent is stripped off and the hydroxy-terminated polyisoprene is isolated. This polymer had the following characteristics:

| OH number | 14 mg KOH / g | |
|---|---|---|
| Molecular weight | 8800 | |
| OH functionality | 2.2 | |
| Microstructure: | cis | 68.3% |
| | trans | 26.7% |
| | 3,4 | 6.7% |

Five milliliters of sec-butyllithium (about 10 percent solution in hexane) and 75 milliliters of toluene are placed in a three-neck, one-liter flask equipped with a stirrer and dropping funnel. 0.3 milliliters of m-divinylbenzene in 25 milliliters of toluene are dropped with stirring into the solution (at about 1 drop/5 seconds) at ice bath temperature. After this addition is complete, 30 milliliters of isoprene are added to the clear red solution with stirring and after polymerization, a slight orange, viscous solution is obtained into which 5 milliliters of methanol are added. The solution is acidified with acetic acid. After filtering off the lithium salts, the solvent is stripped and the hydrogen terminated polyisoprene is isolated. This polymer had the following characteristics:

| molecular weight | | 5500 |
|---|---|---|
| microstructure | cis | 63.2 |
| | trans | 31.2 |
| | 3,4 | 5.6 |

EXAMPLE 3

The same procedure as in Example 2 was followed except that heptane was employed as the solvent and 15 milliliters of isoprene were polymerized. The polymer had the following characteristics:

| molecular weight | | 3000 |
|---|---|---|
| microstructure: | cis | 63.5 |
| | trans | 30.2 |
| | 3,4 | 6.3 |

EXAMPLE 4

The same procedure as in Example 2 was followed, except that heptane was used as the solvent and 30 milliliters of isoprene were polymerized. The poymer was isolated and had the following characteristics:

| molecular weight | | 5300 |
|---|---|---|
| microstructure: | cis | 66.0 |
| | trans | 28.8 |
| | 3,4 | 5.2 |

EXAMPLE 5

The same procedure as in Example 2 was followed, except that heptane was used as the solvent and 60 milliliters of isoprene were polymerized. The polymer was isolated and had the following characteristics:

| molecular weight | | 13,200 |
|---|---|---|
| microstructure: | cis | 72.4 |
| | trans | 22.6 |
| | 3,4 | 4.9 |

EXAMPLE 6

The same procedure as in Example 2 was followed, except that heptane was employed as the solvent and 30 milliliters of 1,3-butadiene were polymerized. The polymer was isolated and had the following microstructure:

| | trans | 43.6 |
|---|---|---|
| | 1,2 | 22.6 |
| | cis | remainder |

EXAMPLE 7

The method and conditions for the preparation of the polyisoprenyllithium were the same as described in Example 1. However, after polymerization 70 milliliters of tetrahydrofuron is distilled into the flask after which 10 milliliters of 1,3-butadiene is condensed into the solution. The copolymer was terminated with isopropanol. A rubbery gumstock is obtained after curing the polymer with 1,10-decanedithiol and t-butyl peroxide at 100°C.

Obviously, modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An organo-dilithium polymerization initiator which is the product formed by the addition of divinylbenzene to a lower alkyllithium in the molar ratio of one mole of divinylbenzene to at least two moles of alkyllithium.

2. The organo-dilithium polymerization initiator of claim 1 wherein said lower alkyllithium is a compound selected from the group consisting of ethyllithium, n-propyllithium, isopropyllithium, n-butyllithium, sec-butyllithium, tert-butyllithium, pentyllithium and hexyllithium and said divnylbenzene is selected from the group consisting of o-divinylbenzene, m-divinylbenzene, and p-divinylbenzene.

3. The organo-dilithium polymerization initiator of claim 2 wherein said lower alkyllithium is sec-butyllithium and said divinylbenzene is m-divinylbenzene.

4. A method for preparing an organio-dilithium polymerization initiator which comprises the addition of divinylbenzene to a lower alkyllithium in a hydrocarbon solvent wherein one mole of divinylbenzene is reacted with at least two moles of the alkyllithium.

5. The method of claim 4 wherein said divinylbenzene is selected from the group consisting of o-divinylbenzene, p-divinylbenzene and m-divinylbenzene and said lower alkyllithium is selected from the group consisting of ethyllithium, n-propyllithium, isopropyllithium, n-butyllithium, tert-butyllithium, sec-butyllithium, pentyllithium and hexyllithium.

6. The method of claim wherein said divinylbenzene is m-divinylbenzene and said lower alkyllithium is sec-butyllithium.

7. The method of claim 4 wherein said hydrocarbon solvent is selected from the group consisting of aliphatic, cycloaliphatic aromatic hydrocarbons and mixtures thereof.

8. The method of claim 7 wherein said aliphatic hydrocarbon is selected from the group consisting of pentane, hexane, heptane and mixtures thereof, said cycloaliphatic hydrocarbon is cyclohexane and said aromatic hydrocarbon is selected from the group consisting of benzene, toluene, xylene, cumene and mixtures thereof.

9. The product prepared by the method of claim 4.
10. The product prepared by the method of claim 5.
11. The product prepared by the method of claim 6.
12. The product prepared by the method of claim 7.
13. The product prepared by the method of claim 8.
14. The method of claim 4 wherein said addition occurs at a temperature at about room temperature or below.
15. The method of claim 4 wherein said addition occurs at a temperature from about −20° to about 20°C.
16. The method of claim 4 wherein said addition is carried out at the rate of about one drop per 5 seconds.
17. The product produced by the method of claim 14.
18. The product produced by the method of claims 15.
19. The product produced by the method of claim 16.
20. A method of preparing an organo-dilithium polymerization initiator consisting essentially of the addition of divinylbenzene to a lower alkyllithium in a hydrocarbon solvent.
21. The method of claim 20 wherein said divinylbenzene is selected from the group consisting of o-divinylbenzene, p-divinylbenzene and m-divinylbenzene and said lower alkyllithium is selected from the group consisting of ethyllithium, n-propyllithium, isopropyllithium, n-butyllithium, tert-butyllithium, sec-butyllithium, pentyllithium and hexyllithium.
22. The method of claim 21 wherein said divinylbenzene is m-divinylbenzene and said lower alkyllithium is sec-butyllithium.
23. The method of claim 20 wherein said hydrocarbon solvent is selected from the group consisting of aliphatic, cycloaliphatic; aromatic hydrocarbons and mixtures thereof.
24. The method of claim 23 wherein said aliphatic hydrocarbon is selected from the group consisting of hexane, heptane, and mixtures thereof, said cycloaliphatic hydrocarbon is cyclohexane and said aromatic hydrocarbon is selected from the group consisting of benzene, toluene, xylene, cumene and mixtures thereof.
25. The method of claim 20 wherein said addition occurs at a temperature at about room temperature or below.
26. The method of claim 20 wherein said addition occurs at a temperature from about −20° to about 20°C.
27. The method of claim 20 wherein said addition is carried out at the rate of about one drop per 5 seconds.
28. An organo-dilithium polymerization initiator which is the product formed by the addition of divinylbenzene to a lower alkyllithium in the molar ratio of one mole of divinylbenzene to two moles of lower alkyllithium.

* * * * *